United States Patent
Miyatake et al.

(10) Patent No.: US 10,847,803 B2
(45) Date of Patent: Nov. 24, 2020

(54) LITHIUM-ION SECONDARY BATTERY AND METHOD OF MANUFACTURE THEREOF

(71) Applicant: Panasonic Intellectual Property Management Co., Ltd., Osaka (JP)

(72) Inventors: Kazufumi Miyatake, Osaka (JP); Toshifumi Nagino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 15/879,934

(22) Filed: Jan. 25, 2018

(65) Prior Publication Data

US 2018/0241043 A1 Aug. 23, 2018

(30) Foreign Application Priority Data

Feb. 23, 2017 (JP) .................................. 2017-032725

(51) Int. Cl.
*H01M 4/66* (2006.01)
*H01M 10/0525* (2010.01)
(Continued)

(52) U.S. Cl.
CPC ......... *H01M 4/661* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS

| 6,444,357 B1 | 9/2002 | Kambe et al. | |
| 2009/0181310 A1* | 7/2009 | Hayashida | H01M 4/0404 429/246 |

(Continued)

FOREIGN PATENT DOCUMENTS

| JP | 2000-090980 | 3/2000 |
| JP | 2001-035484 | 2/2001 |

(Continued)

OTHER PUBLICATIONS

Machine Translation JP2016058247A (Year: 2016).*

*Primary Examiner* — Victoria H Lynch
(74) *Attorney, Agent, or Firm* — Wenderoth, Lind & Ponack, L.L.P.

(57) ABSTRACT

A lithium-ion secondary battery that includes an electricity-generating unit that includes: a positive electrode having a positive electrode collector, and a positive electrode mixture layer formed on a surface of the positive electrode collector; a negative electrode having a negative electrode collector, and a negative electrode mixture layer formed on a surface of the negative electrode collector; and a separator disposed between the positive electrode and the negative electrode. At least one of the positive electrode mixture layer and the negative electrode mixture layer has a high-density portion of high mixture density, and a low-density portion having a lower mixture density than the high-density portion and being in contact with the high-density portion. The low-density portion has a smaller area than the high-density portion when viewed in plan.

9 Claims, 6 Drawing Sheets

(51) Int. Cl.
  *H01M 4/70* (2006.01)
  *H01M 4/04* (2006.01)
  *H01M 10/0587* (2010.01)
  *H01M 2/36* (2006.01)
  *H01M 4/02* (2006.01)

(52) U.S. Cl.
  CPC ......... *H01M 4/70* (2013.01); *H01M 10/0525* (2013.01); *H01M 10/0587* (2013.01); *H01M 2/36* (2013.01); *H01M 2004/021* (2013.01); *H01M 2220/20* (2013.01); *Y02E 60/10* (2013.01); *Y02T 10/70* (2013.01)

(56) References Cited

U.S. PATENT DOCUMENTS

| | | | |
|---|---|---|---|
| 2013/0022867 | A1 | 1/2013 | Suzuki |
| 2015/0017523 | A1* | 1/2015 | Hirai .................. H01M 4/0404 429/211 |
| 2015/0244017 | A1* | 8/2015 | Nishinaka ........... H01M 4/0404 429/233 |
| 2015/0380716 | A1 | 12/2015 | Zama et al. |
| 2016/0181591 | A1* | 6/2016 | Takahata ............... H01M 4/622 29/623.5 |

FOREIGN PATENT DOCUMENTS

| | | | | |
|---|---|---|---|---|
| JP | 5573922 B | | 8/2014 | |
| JP | 2016058247 A | * | 4/2016 | .......... H01M 10/052 |
| WO | 2011/142083 | | 11/2011 | |
| WO | 2014/136714 | | 9/2014 | |

* cited by examiner

LITHIUM-ION SECONDARY BATTERY AND METHOD OF MANUFACTURE THEREOF

TECHNICAL FIELD

The present disclosure relates to a lithium-ion secondary battery, specifically an electrode plate structure of a lithium-ion secondary battery. The present disclosure also relates to a method of manufacture of a lithium-ion secondary battery.

BACKGROUND

There has been active development of electric vehicles (EVs) and hybrid electric vehicles (HEVs) in the automobile industry. Key to the performance of these vehicles is the driving source battery. Lithium-ion secondary batteries have high theoretical energy, and have been often used in automobile applications, and intensively developed for these applications.

A lithium-ion secondary battery has a structure in which a positive electrode plate (positive electrode), a negative electrode plate (negative electrode), and a separator are disposed in layers. An electricity-generating unit of these three members is housed inside a battery casing and an electrolytic solution is injected into the battery casing. The construction of the positive electrode plate includes positive electrode mixture layers formed on both sides of a positive electrode collector. The construction of the negative electrode includes negative electrode mixture layers formed on both sides of a negative electrode collector. The separator is a porous film disposed between the positive electrode plate and the negative electrode plate. In the following, "positive electrode plate" and "negative electrode plate" will also be called "electrode plate", individually or collectively.

The performance of a lithium-ion secondary battery is determined by various factors including: the capacity of the mixture layer in the electrode plate; the permeation rate of the electrolytic solution into the electrode plate; the conduction rate of lithium ions in the electrode plate; and the conduction rate of electrons in the electrode plate.

Japanese Patent No. 5573922 proposes a method for manufacturing a battery electrode whereby a high-density portion and a low-density portion are formed in one of the mixture layers of the electrode plate so as to: balance the conduction rate of lithium ions in the electrode plate; balance the conduction rate of electrons in the electrode plate; improve the output characteristic; and improve other characteristics of a battery. FIG. 6 is a top view schematically showing a configuration of an electrode plate 100 of the related art described in this Japanese patent. In the electrode plate 100, a high-density portion 110 where the mixture in the mixture layer 101 has high density, and a low-density portion 111 where the mixture in the mixture layer has low density are periodically disposed in an orderly fashion at very small intervals (1 mm or less).

The method of the related art described in Japanese Patent No. 5573922 achieves its objective by periodically disposing the high-density portion 110 and the low-density portion 111 at narrow intervals, and does not take into consideration the area proportions of the high-density portion 110 and the low-density portion 111. As mentioned above, the capacity of the mixture layer in the electrode plate is one of the factors that determine the performance of a lithium-ion secondary battery, and, for a given volume, the mixture layer increases its capacity when it is denser. However, the method described in the foregoing related art forms a first mixture layer by drying and rolling the mixture-containing electrode coating material applied to a collector surface, and then forms a second mixture layer by drying and rolling the electrode coating material applied to a predetermined region on the surface of the first mixture layer. Because the region with the second mixture layer becomes the high-density portion 110, and the region with the first mixture layer alone becomes the low-density portion 111, the proportion of the low-density portion 111 is often higher, or about the same as the proportion of the high-density portion 110. This lowers the capacity of the mixture layer in the electrode plate, causing a performance drop in the product lithium-ion secondary battery. Another problem is higher manufacturing costs due to the extra step of re-applying the electrode coating material after rolling of the electrode plate that has been coated with the electrode coating material.

SUMMARY

It is accordingly an object of the present disclosure to provide a lithium-ion secondary battery that can exhibit improved battery performance with high impregnation of an electrolytic solution in the electrode plate while sufficiently maintaining the practical capacity of the mixture layer. The present disclosure is also intended to provide a method for manufacturing such a lithium-ion secondary battery.

In order to achieve the foregoing object, a lithium-ion secondary battery of an aspect of the present disclosure includes:

a positive electrode having a positive electrode collector, and a positive electrode mixture layer formed on a surface of the positive electrode collector;

a negative electrode having a negative electrode collector, and a negative electrode mixture layer formed on a surface of the negative electrode collector; and a separator disposed between the positive electrode and the negative electrode, at least one of the positive electrode mixture layer and the negative electrode mixture layer having a high-density portion of high mixture density, and a low-density portion having a lower mixture density than the high-density portion and being in contact with the high-density portion, the low-density portion having a smaller area than the high-density portion when viewed in plan.

In order to achieve the foregoing object, a method for manufacturing a lithium-ion secondary battery of an aspect of the present disclosure includes:

a first step of producing a positive electrode that includes a positive electrode collector, and a positive electrode mixture layer formed on a surface of the positive electrode collector;

a second step of producing a negative electrode that includes a negative electrode collector, and a negative electrode mixture layer formed on a surface of the negative electrode collector; and a third step of disposing the positive electrode, a separator, and the negative electrode so as to interpose the separator between the positive electrode and the negative electrode, at least one of the positive electrode mixture layer and the negative electrode mixture layer having a high-density portion of high mixture density, and a low-density portion having a lower mixture density than the high-density portion and being in contact with the high-density portion, the low-density portion having a smaller area than the high-density portion when viewed in plan.

The present disclosure has enabled providing a lithium-ion secondary battery that can exhibit improved battery performance with the high impregnation (permeability) of an electrolytic solution in the electrode plate while sufficiently maintaining the practical capacity of the mixture layer. The present disclosure has also enabled a method for manufacturing such a lithium-ion secondary battery.

DESCRIPTION OF EMBODIMENTS

Figure 1:
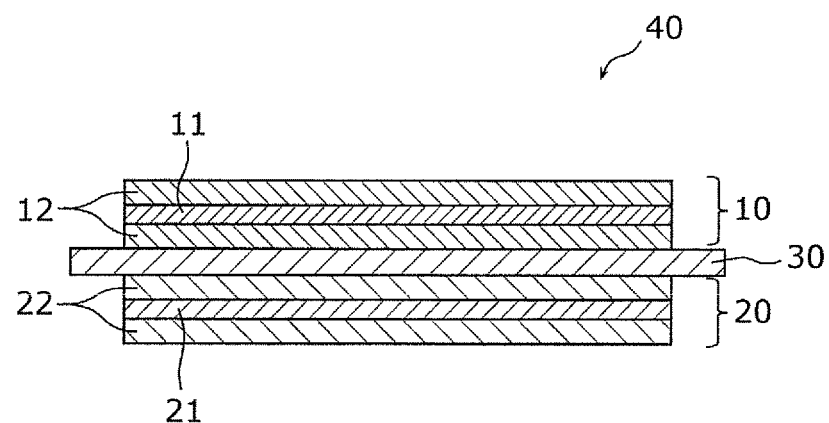
FIG. 1 is a cross sectional view schematically illustrating a configuration of an electricity-generating unit in a lithium-ion secondary battery according to an embodiment.

An embodiment of the present disclosure is described below with reference to the accompanying drawings. It is to be noted that the following embodiment is intended to solely illustrate a preferred specific example of the present disclosure. Accordingly, the descriptions of the following embodiment, including various numerical values, constituting elements, the locations of constituting elements, the way the constituting elements are connected, manufacturing steps, and the order of manufacturing steps are merely illustrative, and are not intended to limit the present disclosure. It follows from this that those constituting elements described in the embodiment below but are not recited in the independent claims, which stand alone, will be described as optional elements.

The accompanying drawings are schematic views, and do not necessarily represent the embodiment in a strict sense. In the drawings, the same reference numerals are used to refer to essentially the same configurations, and descriptions of such configurations will be omitted or simplified to avoid redundancy.

Embodiment

Figure 2A:
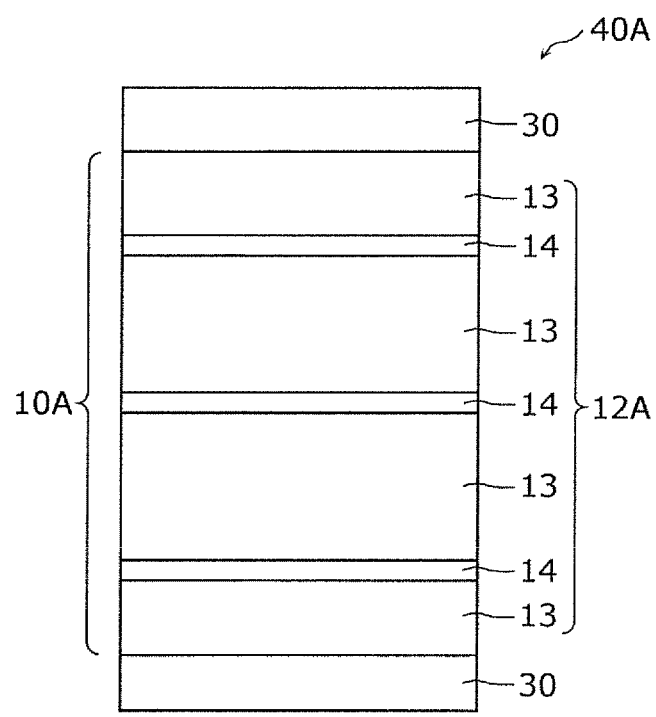
FIG. 2A is a top view representing an exemplary layout of a high-density portion and a low-density portion of a positive electrode of the embodiment.
Figure 2B:
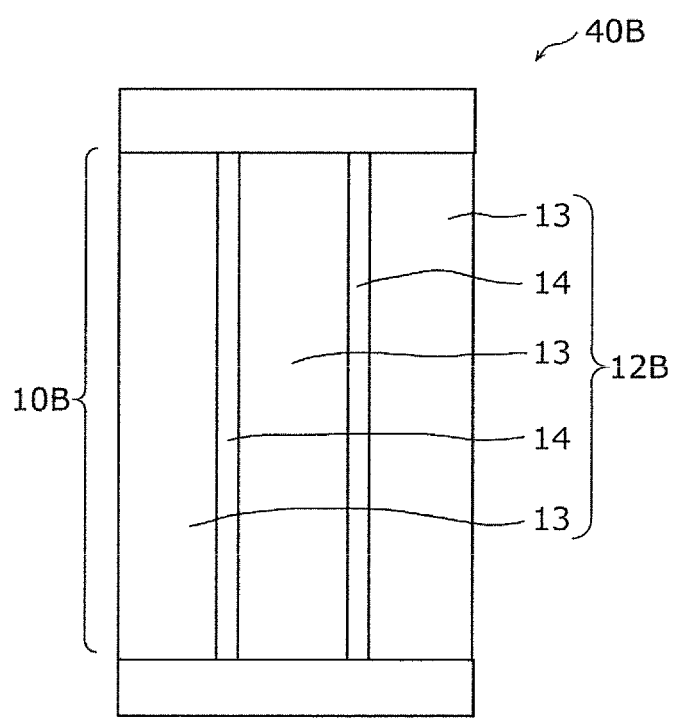
FIG. 2B is top view representing another exemplary layout of the high-density portion and the low-density portion of the positive electrode of the embodiment.

A lithium-ion secondary battery according to an embodiment is described below with reference to the accompanying drawings.
A. Lithium-Ion Secondary Battery A lithium-ion secondary battery according to the present embodiment is described below with reference to FIG. 1 to FIG. 2B. FIG. 1 is a cross sectional view schematically illustrating a configuration of an electricity-generating unit 40 in a lithium-ion secondary battery 1 according to the present embodiment. FIG. 2A is a top view representing an exemplary layout of a high-density portion 13 and a low-density portion 14 of a positive electrode 10 of the present embodiment. FIG. 2B is top view representing another exemplary layout of the high-density portion 13 and the low-density portion 14 of the positive electrode 10 of the present embodiment.

As illustrated in FIG. 1, the lithium-ion secondary battery 1 according to the present embodiment includes an electricity-generating unit 40 that includes the positive electrode 10 having a positive electrode collector 11, and positive electrode mixture layers 12 formed on surfaces of the positive electrode collector 11; a negative electrode 20 having a negative electrode collector 21, and negative electrode mixture layers 22 formed on surfaces of the negative electrode collector 21; and a separator 30 disposed between the positive electrode 10 and the negative electrode 20.

The positive electrode 10, the negative electrode 20, and the separator 30 shown in FIG. 1 are configured in rectangular shapes in planar view. However, the configuration is not limited to this, and may be appropriately selected from any shape according to the specifications of the lithium-ion secondary battery 1.

As illustrated in FIGS. 2A and 2B, at least one of the positive electrode mixture layer 12 and the negative electrode mixture layer 22 in the lithium-ion secondary battery 1 according to the present embodiment has a high-density portion 13 of high mixture density, and a low-density portion 14 having a lower mixture density than the high-density portion 13 and being in contact with the high-density portion 13. The low-density portion 14 has a smaller area than the high-density portion 13 when viewed in plan.

By the provision of the high-density portion 13 and the low-density portion 14, the lithium-ion secondary battery 1 according to the present embodiment can improve its battery characteristics, including the output characteristic, by reducing the impregnation time of the electrolytic solution into the electrode plate (e.g., the positive electrode 10) while sufficiently maintaining its battery capacity in the practical range.

The positive electrode 10 of the present embodiment is not particularly limited. The high-density portion 13 and the low-density portion 14 may be provided for the negative electrode mixture layer 22 of the negative electrode 20, or for both the positive electrode mixture layer 12 and the negative electrode mixture layer 22.

As illustrated in FIG. 2A, a form of the positive electrode 10 of the present embodiment is such that the high-density portion 13 that is relatively wider and extending in width direction, and the low-density portion 14 that is relatively narrower and extending in width direction are alternately formed in lengthwise direction in a positive electrode mixture layer 12A, substantially parallel and adjacent to each other. The positive electrode mixture layer 12A, in which the high-density portion 13 has a larger area than the low-density portion 14 when viewed in plan, is formed on both surfaces of the positive electrode collector 11.

As illustrated in FIG. 2B, another form of the positive electrode 10 of the present embodiment is such that the high-density portion 13 that is relatively wider and extending in lengthwise direction, and the low-density portion 14 that is relatively narrower and extending in lengthwise direction are alternately in width direction in a positive electrode mixture layer 12B, substantially parallel and adjacent to each other. The positive electrode mixture layer 12B, in which the high-density portion 13 has a larger area than the low-density portion 14, is formed on the both surfaces of the positive electrode collector 11.

In the present embodiment, the positive electrode mixture layer 12A and the positive electrode mixture layer 12B are formed in predetermined regions of the positive electrode collector 11. However, the configuration is not limited to this, and the positive electrode mixture layers 12A and 12B may be formed in any region on a surface of the positive electrode collector 11.

In the present embodiment, the forms represented in FIGS. 2A and 2B are applicable to the negative electrode 20.

The pattern of the high-density portion 13 and the low-density portion 14 in the positive electrode mixture layer 12 and the negative electrode mixture layer 22 is not particularly limited, as long as the high-density portion 13 has a larger area than the low-density portion 14. For example, the high-density portion 13 and the low-density portion 14 of a relatively simple shape may be formed in a repeating pattern as shown in FIGS. 2A and 2B, or in a complex pattern in which the high-density portion 13 and the low-density portion 14 occur in an arbitrary fashion. By making the area of the low-density portion 14 smaller, the capacity of the positive electrode mixture layer 12 can be sufficiently maintained in the practical range, while the larger area of the high-density portion 13 improves the output characteristic and other characteristics of the battery.

In the lithium-ion secondary battery 1 according to the present embodiment, the area of the low-density portion 14 should desirably be sufficiently smaller than the area of the high-density portion 13. Increasing the area of the low-density portion 14 shortens the impregnation time of the electrolytic solution into the electrode plate, and improves battery characteristics. However, studies by the present inventors have found that the battery capacity reduces as the area of the low-density portion 14 increases. Accordingly, the area of the low-density portion 14 may be 1/10 of the area of the high-density portion 13, or smaller. Preferably, the area ratio of the low-density portion 14 to the high-density portion 13 is more than 0 and 1/10 or less, more preferably 1/20 or more and 1/10 or less. With the area proportion of the low-density portion 14 (the area of the low-density portion 14/the area of the high-density portion 13) kept in the foregoing ranges, the impregnation time of the electrolytic solution into the electrode plate (e.g., positive electrode 10) can be reduced further while reducing the capacity drop in the mixture layer (e.g., positive electrode mixture layer 12). Preferably, the high-density portion 13 and the low-density portion 14 have the same or substantially the same thickness. For example, when the high-density portion 13 is thicker than the low-density portion 14, the high-density portion 13 of the mixture layer will be in contact with the separator 30, but a gap is created between the thinner low-density portion 14 and the separator 30. In this case, the mixture capacity will be reduced by the amount of the gap, and the capacity of the lithium-ion secondary battery 1 reduces. The thicknesses are "the same or substantially the same" because it is practically not possible to achieve exactly the same thickness because of variation in manufacturing processes.

The pattern of the high-density portion 13 and the low-density portion 14 may be formed only on one of the two surfaces of the collector (the positive electrode collector 11, the negative electrode collector 21), or on both surfaces of the collector. The pattern may be formed only on the positive electrode 10 or the negative electrode 20, or on both the positive electrode 10 and the negative electrode 20.

The shape of the pattern of the high-density portion 13 and the low-density portion 14 may be the same for the both surfaces of the collector (the positive electrode collector 11, the negative electrode collector 21), or these surfaces may have different patterns. The shape of the pattern may be the same or different for the positive electrode 10 and the negative electrode 20. For example, both surfaces may have the shape of the pattern shown in FIG. 2A, or one of the surfaces may have the pattern of the shape shown in FIG. 2A while the pattern on the other surface has the shape shown in FIG. 2B.

In the lithium-ion secondary battery 1 according to the present embodiment, a density gradient region (not illustrated) may be provided at the boundary between the high-density portion 13 and the low-density portion 14, and in at least apart of region in the vicinity of the boundary. A density gradient region is a region where the density shows gradual changes from one place to another place. For example, the density gradient region can be a region where the density is lower than in the high-density portion 13, and higher than in the low-density portion 14, and in which the density gradually changes from one place to another place. Because the mixture density is higher in the high-density portion 13, the high-density portion 13 is inferior to the low-density portion 14 in terms of impregnation of the electrolytic solution. When the high-density portion 13 and the low-density portion 14 are directly in contact with each other, the electrolytic solution more preferentially impregnates the low-density portion 14, and it takes a longer time to impregnate the high-density portion 13 with the electrolytic solution. However, with the density gradient region provided at the boundary and in the vicinity of the boundary between the high-density portion 13 and the low-density portion 14, the electrolytic solution that more preferentially impregnates the low-density portion 14 also partly impregnates the high-density portion 13 via the density gradient region. The impregnation time of the electrolytic solution can also be further reduced.

The planar width of the density gradient region is not particularly limited, and may be adjusted according to factors, for example, such as the viscosity of the electrode coating material (a slurry for mixture layer), and the thickness of the undried coating (a coating formed by an electrode coating material) for the high-density portion 13 and the low-density portion 14. In the present disclosure, an electrode coating material is applied in different thicknesses to the designated regions of the high-density portion 13 and the low-density portion 14 on a collector surface to form a coating at once. Because the undried electrode coating material has fluidity, the electrode coating material partially flows toward the designated region for the low-density portion 14 from the designated region for the high-density portion 13, and the density gradient region is formed between the high-density portion 13 and the low-density portion 14 upon drying and rolling.

Considering the balance between factors such as impregnation of the electrolytic solution in the high-density portion 13 and capacity, the planar width of the density gradient region is, for example, at least 1/5 of the planar width of the low-density portion.

The following describes the constituting elements of the lithium-ion secondary battery 1 according to the present embodiment.

A-1. Positive Electrode

The positive electrode 10 of the present embodiment has the positive electrode collector 11, and the positive electrode mixture layers 12 formed on surfaces of the positive electrode collector 11. Specifically, as illustrated in FIG. 1, the positive electrode 10 of the present embodiment has the positive electrode collector 11, and the positive electrode mixture layers 12 capable of storing and releasing lithium ions, and are formed on both sides of the positive electrode collector 11 in the thickness direction. As described above, the positive electrode mixture layer 12 has the high-density portion 13 and the low-density portion 14, and the density gradient region 15 may be formed at the boundary region between the high-density portion 13 and the low-density portion 14 (at the boundary, and regions in the vicinity of the boundary). These constituting members are the minimum elements of the positive electrode, and the positive electrode may include other members. The present disclosure is also not limited to the embodiment above, and the positive electrode mixture layer 12 may be formed on one side of the positive electrode collector 11.

The positive electrode mixture layer 12 is a layer formed of a positive electrode active material bound by a binder. The binder binds the positive electrode collector 11 and the positive electrode active material to each other. The positive electrode active material itself is also bound by the binder. The positive electrode mixture layer 12 may contain other substances, such as a conductive auxiliary agent, as required.

The positive electrode active material is not particularly limited, as long as it can store and release lithium ions. Examples of the positive electrode active material include oxides of lithium and transition metals, such as lithium cobalt oxide, lithium nickel oxide, and lithium manganese oxide; transition metal sulfides such as FeS, and $TiS_2$; and organic compounds such as polyaniline, and polypyrrole.

The binder is not particularly limited. Examples of the binder include fluororesins such as polyvinylidene fluoride, and polytetrafluoroethylene; fluororubbers such as a copolymer of vinylidene fluoride, hexafluoropropylene, and tetrafluoroethylene; latexes such as a styrene-butadiene copolymer latex; and cellulose derivatives such as carboxylmethyl cellulose. The binder may be used alone or in a combination of two or more, as required.

The conductive auxiliary agent is not particularly limited, and is, for example, a carbon powder such as acetylene black, carbon black, and graphite. The conductive auxiliary agent may be used alone or in a combination of two or more, as required.

The positive electrode collector 11 is not particularly limited, as long as it has high conductivity. The positive electrode collector 11 may be, for example, a metallic thin plate member such as a metal foil, and a metal roll sheet, or a conductive resin film. The positive electrode collector 11 may be, for example, a foil or a sheet of materials such as SUS, copper, a copper alloy, and nickel. It is preferably an aluminum foil.

A-2. Negative Electrode

The negative electrode 20 of the present embodiment has the negative electrode collector 21 and the negative electrode mixture layers 22 formed on surfaces of the negative electrode collector 21. Specifically, as illustrated in FIG. 1, the negative electrode 20 of the present embodiment is configured from the negative electrode collector 21 and the negative electrode mixture layers 22 capable of storing and releasing lithium ions, and are formed on both sides of the negative electrode collector 21 in the thickness direction. As described above, the negative electrode mixture layer 22 has a high-density portion 13 and a low-density portion 14, and the density gradient region 15 may be formed in the boundary region between the high-density portion 13 and the low-density portion 14 (at the boundary, and regions in the vicinity of the boundary). These constituting members are the minimum elements of the negative electrode, and the negative electrode may include other members. The present disclosure is not limited to the embodiment above, and the negative electrode mixture layer 22 may be formed on one surface of the negative electrode collector 21.

The negative electrode mixture layer 22 is a layer formed of a negative electrode active material bound by a binder. The binder binds the negative electrode collector 21 and the negative electrode active material to each other. The negative electrode active material itself is also bound by the binder. The negative electrode mixture layer may contain other substances, such as a conductive auxiliary agent, as required.

Examples of the binder and the conductive auxiliary agent are the same as described for the positive electrode in section A-1 above.

The negative electrode active material is not particularly limited, as long as it can store and release lithium ions. Examples of the negative electrode active material include carbon-based active materials such as graphite and cokes; metallic lithium, lithium transition metal nitrides, and silicon.

The negative electrode collector 21 is not particularly limited, as long as it has high conductivity, and may be, for example, a metallic thin plate member such as a metal foil, and a metal roll sheet, or a conductive resin film. The negative electrode collector 21 may be, for example, a foil or a sheet of materials such as SUS, copper, a copper alloy, and nickel. It is preferably a copper foil.

A-3. Separator

The separator 30 of the present embodiment is disposed between the positive electrode 10 and the negative electrode 20. The separator 30 is not particularly limited, as long as it can insulate the positive electrode 10 and the negative electrode 20 from each other, and allows for movement of lithium ions inside. For example, the separator 30 may be an insulating polymer porous film. The separator 30 may, for example, be formed as follows. A slurry is prepared by mixing, for example, a binder, a solvent, and various additives into inorganic particles (such as alumina silica, magnesium oxide, titanium oxide, zirconia, silicon carbide, and silicon nitride), organic particles (such as polyethylene, polypropylene, polystyrene, polyacrylonitrile, polymethylmethacrylate, polyvinylidene fluoride, polytetrafluoroethylene, and polyimide), or a mixture of such inorganic particles and organic particles. The slurry is then applied onto a flat substrate, dried, and rolled after being peeled off from the substrate.

Preferably, the positive electrode 10, the negative electrode 20, and the separator 30 are kept in an electrolytic solution of an electrolyte and a nonaqueous solvent. For example, the positive electrode 10, the negative electrode 20, and the separator 30 can be kept in an electrolytic solution by being disposed in the electrolytic solution. Specifically, for example, an electricity-generating unit including the separator disposed between the positive electrode 10 and the negative electrode 20 is inserted in a casing, and the electrolytic solution is injected into the casing to keep the positive electrode 10, the negative electrode 20, and the separator 30 in the electrolytic solution.

The electrolyte is not particularly limited. Examples of the electrolyte include lithium salts such as lithium perchloride ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and bis(trifluoromethanesulfonimide) (LiN(CF$_3$SO$_2$)$_2$). The electrolyte may be used either alone or in a combination of two or more, as required.

The nonaqueous solvent used for the electrolytic solution is not particularly limited. Examples of the nonaqueous solvent include ethylene carbonate, propylene carbonate, butylene carbonate, dimethyl carbonate, diethyl carbonate, γ-butyrolactone, sulfolane, acetonitrile, 1,2-dimethoxyethane, 1,3-dimethoxypropane, diethyl ether, tetrahydrofuran, 2-methyltetrahydrofuran, and γ-butyrolactone. The nonaqueous solvent may be used alone or in a combination of two or more.

The electricity-generating unit 40 of the present embodiment having the configuration described above may be provided as a laminated electricity-generating unit 40 by laminating a plurality of electricity-generating units 40 via the separator 30, or as a wound electricity-generating unit 40 by being wound around with one of its lengthwise ends at the center. One end of an electrode lead (not illustrated) is welded to a predetermined location of the positive electrode collector 11 and the negative electrode collector 21 for each of these collectors. The positive electrode collector 11 and the negative electrode collector 21 are then housed inside a battery casing of a predetermined shape (not illustrated), and the other end of each electrode lead is drawn out of the battery casing. The lithium-ion secondary battery 1 of the present disclosure can then be obtained by injecting the electrolytic solution, and sealing the battery casing.

A-4. Wound Electricity-Generating Unit

The wound electricity-generating unit 40 of the present embodiment is described below with reference to FIG. 4 to FIG. 5B.

Figure 4:
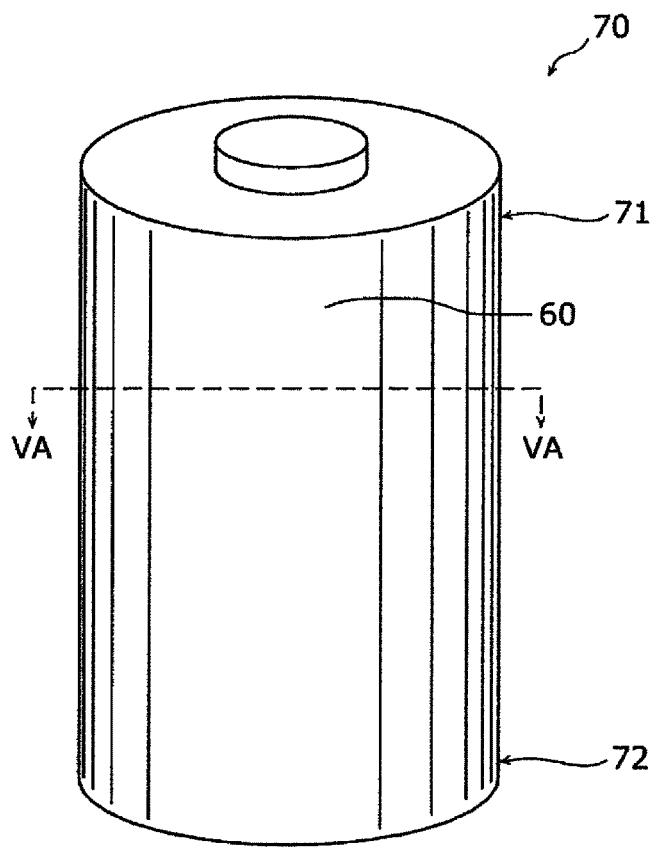
FIG. 4 is a perspective view schematically representing an embodiment of the external appearance of a wound electricity-generating unit of the embodiment.
Figure 5A:
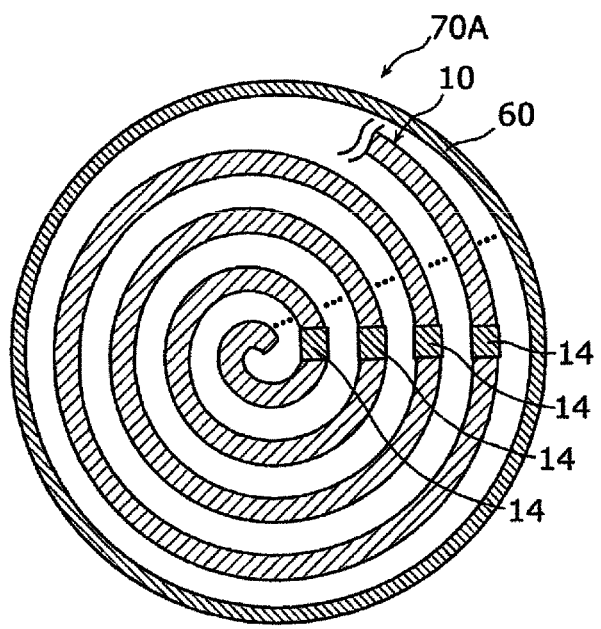
FIG. 5A is a cross sectional view schematically illustrating an example of a wound electricity-generating unit of the embodiment.

FIG. 4 is a perspective view schematically representing an embodiment of the external appearance of the wound electricity-generating unit 40 of the present embodiment. FIG. 5A is a cross sectional view schematically illustrating an example of the wound electricity-generating unit 40 of the lithium-ion secondary battery 1 (for example, cylindrical battery 70A) according to the present embodiment. FIG. 5B is a cross sectional view schematically illustrating another example of the wound electricity-generating unit 40 of the lithium-ion secondary battery 1 (for example, cylindrical battery 70B) of the present embodiment. The schematic cross sectional views of FIGS. 5A and 5B are taken at line VA-VA of FIG. 4. In FIGS. 5A and 5B, the configuration of the wound electricity-generating unit 40 other than the positive electrode 10 is omitted for simplicity.

In the lithium-ion secondary battery 1 according to the present embodiment, the electricity-generating unit 40 including the positive electrode 10, the negative electrode 20, and the separator 30 may be wound, and used as a wound electricity-generating unit 40. The wound electricity-generating unit 40 is typically housed inside a unidirectionally long, cylindrical battery casing 60 as shown in FIG. 4, and configured as, for example, a cylindrical battery 70.

In the case of the cylindrical battery 70, the low-density portion 14 may be formed so as to join the upper portion 71 and the lower portion 72 of the cylindrical battery 70 in the lengthwise direction of the battery. Specifically, the low-density portion 14 may be at least partly exposed at at least one of the end portion 41 and the end portion 42 of the wound electricity-generating unit 40 (hereinafter, also referred to simply as "electricity-generating unit"), or may be at least partly exposed at both end portions 41 and 42 of the electricity-generating unit 40, and disposed in different directions as viewed from the center of the electricity-generating unit 40.

The electrode plates (the positive electrode 10 and the negative electrode 20) expand and contract in the repeated charge and discharge of the lithium-ion secondary battery 1. As the electrode plates (the positive electrode 10 and the negative electrode 20) expand, the electrolytic solution impregnated in the electricity-generating unit 40 (the positive electrode 10, the negative electrode 20, and the separator 30) moves to the upper portion 71 and the lower portion 72, and to regions in the vicinity of the upper portion 71 and the lower portion 72 in the lengthwise direction of the cylindrical battery 70. During the contraction of the electrode plates (the positive electrode 10 and the negative electrode 20), the electrolytic solution re-impregnates the electricity-generating unit 40 (the positive electrode 10, the negative electrode 20, and the separator 30) from the upper portion 71 and the lower portion 72, and from regions in the vicinity of the upper portion 71 and the lower portion 72 in the lengthwise direction of the cylindrical battery 70. The battery characteristics improve when the impregnation time is shorter.

In order to reduce the impregnation time of the electrolytic solution, the low-density portion 14, which becomes easily impregnated with the electrolytic solution, may be at least in part connected to the upper portion 71 and/or the lower portion 72 in the lengthwise direction of the cylindrical battery 70 (wound lithium-ion secondary battery 1), where the electrolytic solution accumulates during the expansion of the electrode plates (the positive electrode 10 and the negative electrode 20), as described above. Specifically, at least a part of the low-density portion 14 is desirably exposed at the both end portions 41 and 42 in the lengthwise direction of the electricity-generating unit 40, and joins the upper portion 71 and the lower portion 72 of the cylindrical battery 70 in the lengthwise direction. For example, such an electricity-generating unit 40 can be obtained by producing the wound electricity-generating unit 40 with the electrode plates having the low-density portion 14 as shown in FIG. 2A.

Figure 5B:
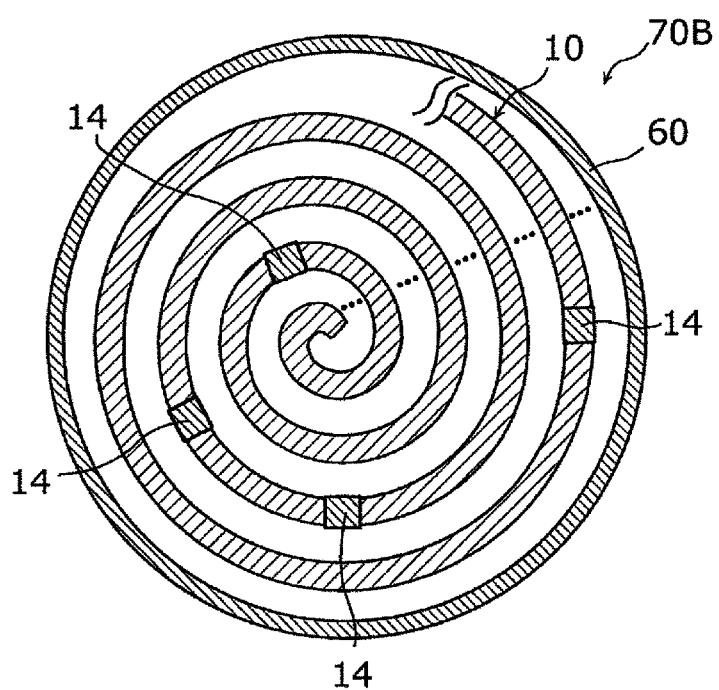
FIG. 5B is a cross sectional view schematically illustrating another example of the wound electricity-generating unit of the embodiment.
Figure 6:
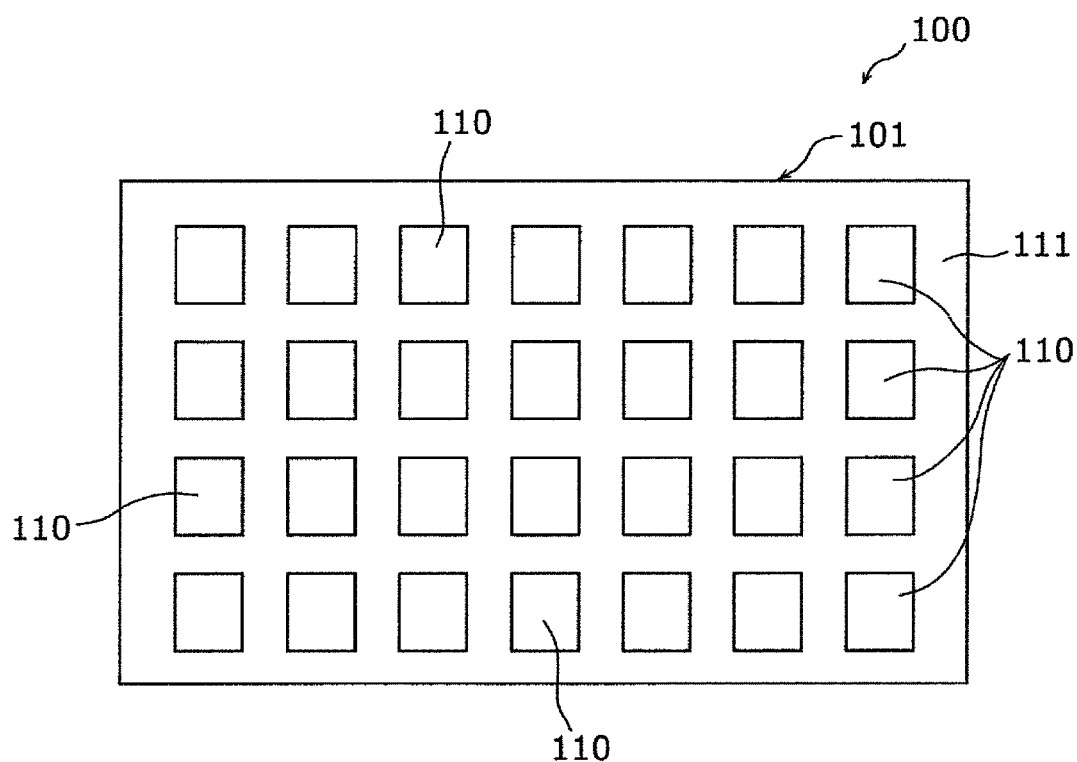
FIG. 6 is a top view schematically showing a configuration of the electrode plate described in Japanese Patent No. 5573922.

When the electricity-generating unit 40 is provided as a wound electricity-generating unit, the low-density portion 14 may be at least partly exposed at the both end portions 41 and 42 of the electricity-generating unit 40, and disposed indifferent directions as viewed from the center of the electricity-generating unit 40, as shown in FIG. 5B, so that the impregnation of the electrolytic solution takes place in a shorter time period, and the battery characteristics improve. Here, it is desirable that, for example, the low-density portion 14 joins the upper portion 71 and the lower portion 72 of the cylindrical battery 70B in the lengthwise direction. This is because the low-density portion 14 becomes more easily impregnated with the electrolytic solution. During the expansion of the electrode plates, the electrolytic solution moves to the upper portion 71 and the lower portion 72, and to regions in the vicinity of the upper portion 71 and the lower portion 72 in the lengthwise direction of the cylindrical battery 70. The foregoing configuration is desirable for improved battery performance because the electrolytic solution that has moved to the upper portion 71 and the lower portion 72 can more quickly impregnate the electricity-generating unit 40 (the positive electrode 10, the negative electrode 20, and the separator 30) as soon as the electrode plates contract.

In the present embodiment, the low-density portion 14 may be at least partly disposed in a straight line from the center of the electricity-generating unit 40 toward a point on the outer circumference, as shown in FIG. 5A. However, the form shown in FIG. 5B is more preferred from the viewpoint of improving impregnation of the electrolytic solution (reducing impregnation time).

B. Lithium-Ion Secondary Battery Manufacturing Method

A lithium-ion secondary battery manufacturing method of an embodiment of the present disclosure is described below with reference to FIG. 2A to FIG. 5B.

Figure 3:
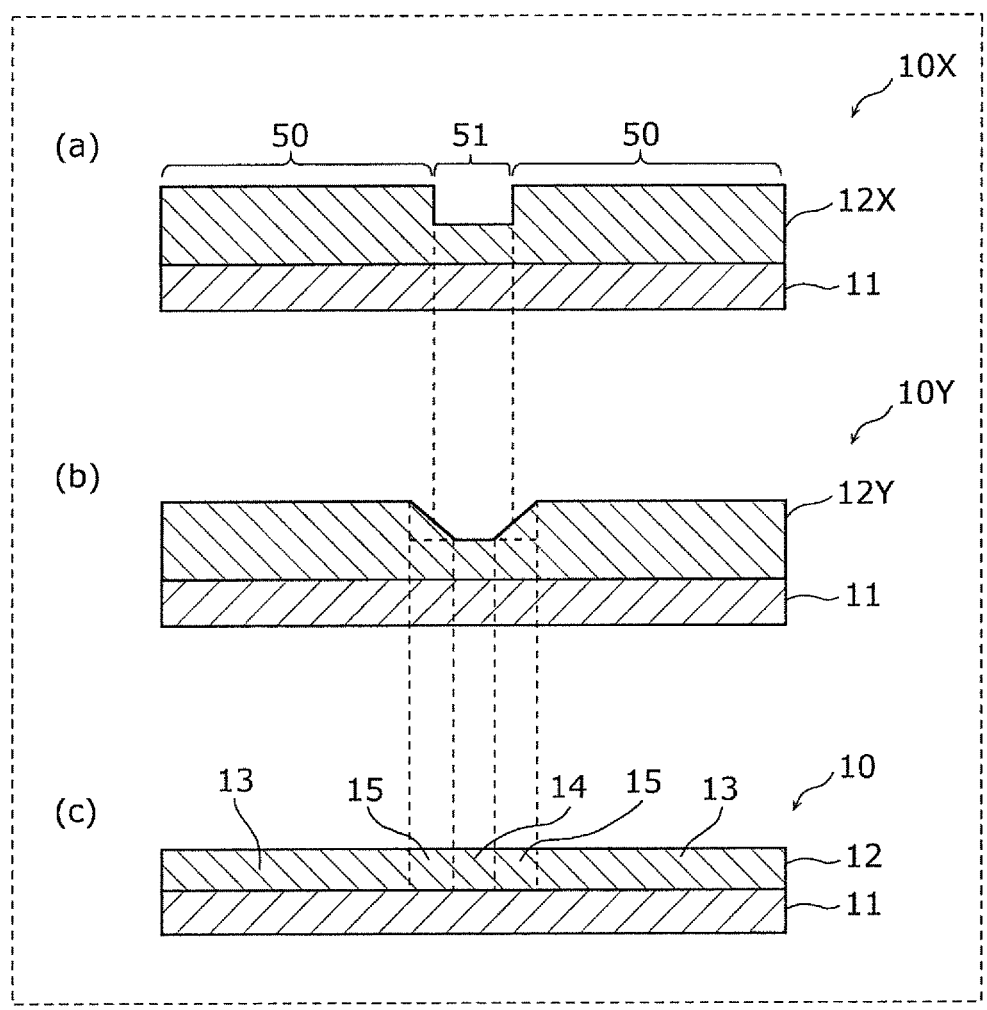
FIG. 3 is a cross sectional view schematically showing how the shape of the positive electrode of the embodiment changes during production.

FIG. 3 is a cross sectional view schematically showing how the shape of the positive electrode 10 of the present embodiment changes during production.

The method for manufacturing the lithium-ion secondary battery 1 according to the present embodiment includes:

a first step of producing a positive electrode 10 that includes a positive electrode collector 11, and a positive electrode mixture layer 12 formed on a surface of the positive electrode collector 11;

a second step of producing a negative electrode 20 that includes a negative electrode collector 21, and a negative electrode mixture layer 22 formed on a surface of the negative electrode collector 21; and a third step of disposing a separator 30 between the positive electrode 10 and the negative electrode 20, at least one of the positive electrode mixture layer 12 and the negative electrode mixture layer 22 has a high-density portion 13 of high mixture density, and a low-density portion 14 having a lower mixture density than the high-density portion 13 and being in contact with the high-density portion 13, the low-density portion 14 having a smaller area than the high-density portion 13 when viewed in plan.

Specifically, the first step is a step of producing the positive electrode, and includes a coating step, a drying step, and a rolling step. The second step is a step of producing the negative electrode, and includes a coating step, a drying step, and a rolling step. The third step is a step of disposing (laminating) a separator between the positive electrode and the negative electrode obtained in the first step and the second step. Either the first step or the second step may be performed first.

In the embodiment of the present disclosure, at least one of the positive electrode mixture layer 12 and the negative electrode mixture layer 22 has a portion of higher mixture density (high-density portion 13) and a portion of lower mixture density (low-density portion 14), as described above. The high-density portion 13 and the low-density portion 14 are formed by the method described the coating steps of the first step and the second step described below.

B-1. First Step

In the first step of the present embodiment, the positive electrode 10 is produced. The first step includes the positive electrode mixture layer 12 being formed on a surface of the positive electrode collector 11. Specifically, the first step includes a coating step, a drying step, and a rolling step.

The following described each step.

B-1-1. Coating Step

In the coating step, a positive electrode slurry containing a positive electrode mixture is coated on a surface of the positive electrode collector 11 to form a positive electrode mixture slurry layer 12X on the surface of the positive electrode collector 11.

The positive electrode slurry contains a solvent, and a positive electrode active material and a binder dissolved or dispersed in the solvent. The positive electrode active material and the binder are not particularly limited, and may be appropriately selected from, for example, the examples above. The solvent is not particularly limited, as long as it can dissolve or disperse the binder. Examples of the solvent include water, N-methyl-2-pyrrolidone, methyl ethyl ketone, acetone, cyclohexanone, butyl acetate, methanol, andethanol. Preferably, the positive electrode slurry further contains a conductive auxiliary agent. The conductive auxiliary agent is not particularly limited, and may be appropriately selected from, for example, the examples above. The positive electrode slurry may further contain various additives such as a dispersant, a surfactant, and a rheology adjuster, as required.

As mentioned above, the high-density portion 13 and the low-density portion 14, which are formed upon rolling, are formed by applying the positive electrode slurry on a surface of the positive electrode collector 11 in different amounts in the coating step. In the present embodiment, the positive electrode mixture layer 12 having the high-density portion 13 and the low-density portion 14 are formed on both surfaces of the positive electrode collector 11.

In the present embodiment, for example, as shown in (a) of FIG. 3, a high-density portion designated region 50 and a low-density portion designated region 51 are set on a surface of the positive electrode collector 11. For example, when producing the positive electrode 10 shown in FIG. 2A, the high-density portion designated region 50 and the low-density portion designated region 51 are a relatively wider region and a relatively narrower region, respectively, that extend along the width of the positive electrode collector 11, and are alternately formed substantially parallel to each other in the lengthwise direction of the positive electrode collector 11. Here, the positive electrode slurry may be applied to the positive electrode collector 11 in such a manner that the positive electrode mixture slurry layer 12X formed by the positive electrode slurry will be thicker in the high-density portion designated region 50 than in the low-density portion designated region 51. In this way, the amount of positive electrode slurry coating can be different between these regions.

Referring to FIG. 3, the following describes changes in the shape of the positive electrode 10X, 10Y, and 10 from immediately after the coating of the positive electrode mixture slurry layer formed on a surface of the positive electrode collector 11 to the time the rolling is finished. For ease of explanation, FIG. 3 shows the positive electrode mixture slurry layer 12X, 12Y formed by applying the positive electrode slurry to only one surface of the positive electrode collector 11. However, the shape of the positive electrode mixture slurry layer 12X, 12Y described below is applicable not only to one of the positive electrode mixture layers 12, but to the both positive electrode mixture layers 12. The shape of the positive electrode mixture slurry layer 12X, 12Y is also applicable to the positive electrode 10 or the negative electrode 20, or both.

(a) of FIG. 3 shows a cross section across the thickness of the positive electrode 10X immediately after the positive electrode slurry is applied to a surface of the positive electrode collector 11. The high-density portion designated region 50 of the positive electrode mixture slurry layer 12X is a region where a larger amount of positive electrode slurry has been applied than in the low-density portion designated region 51, and forms the high-density portion 13 after the rolling step (described later). The low-density portion designated region 51 is a region where a smaller amount of positive electrode slurry has been applied than in the high-density portion designated region 50, and forms the low-density portion 14 after the rolling step. As illustrated in (a) of FIG. 3, the high-density portion designated region 50 and the low-density portion designated region 51 are adjacent each other. The shape of the high-density portion designated region 50 and the low-density portion designated region 51 is not particularly limited, and may have a stripe or a spot pattern, provided that these portions are adjacent each other.

When formed in a stripe pattern in planar view, the high-density portion designated region 50 and the low-density portion designated region 51 are preferably laid out in, broadly, horizontal direction (the width direction of the positive electrode collector 11) and vertical direction (the lengthwise direction of the positive electrode collector 11) in a planar view of the positive electrode 10, for example, as shown in FIGS. 2A and 2B, from the viewpoints of, for example, ease of coating of the positive electrode slurry, and adjustability of the areas of the high-density portion 13 and the low-density portion 14 (areas in planar view). However, the layout pattern is not limited to this, and the high-density portion designated region 50 and the low-density portion designated region 51 may be laid out in various patterns, from a simple shape (stripes) to a more complex shape (e.g., spot pattern), as mentioned above.

The method for forming the high-density portion designated region 50 with a larger amount of positive electrode slurry, and the low-density portion designated region 51 with a smaller amount of positive electrode slurry is not particularly limited. For example, in the case of die coating, an intermittent valve may be used to adjust the applied amount of positive electrode slurry. By controlling an intermittent valve, the region coated with a larger amount of positive electrode slurry (the high-density portion designated region 50) and the region coated with a smaller amount of positive electrode slurry (low-density portion designated region 51) can be laid out in a horizontal pattern (the width direction of the positive electrode collector 11) as shown in FIG. 2A. The vertical layout pattern (the lengthwise direction of the positive electrode collector 11) as shown in FIG. 2B can be formed by partially narrowing the outlet port of the die ejecting the positive electrode slurry. A more complex planar shape of the high-density portion designated region 50 and the low-density portion designated region 51 can be formed by using, for example, a gravure roll.

B-1-2. Drying Step

The coating step is followed by drying of the positive electrode 10X.

In the drying step, the positive electrode mixture slurry layer 12X formed on a surface of the positive electrode collector 11 is dried to form a positive electrode mixture slurry layer 12Y. In the drying step, the positive electrode collector 11 becomes bonded with the positive electrode mixture slurry layer 12Y.

The positive electrode mixture slurry layer 12X cannot dry instantaneously, even though the coating step is immediately followed by the drying step, so that some of the positive electrode slurry flows into the region coated with a smaller amount of positive electrode slurry (the low-density portion designated region 51) from the region coated with a larger amount of positive electrode slurry (high-density portion designated region 50) in the positive electrode mixture slurry layer 12Y as shown in (b) of FIG. 3. This forms a slanted surface at the boundary and in regions in the vicinity of the boundary between the high-density portion designated region 50 and the low-density portion designated region 51. The slanted surface becomes the density gradient region 15 after the drying step ((b) of FIG. 3) and the rolling step ((c) of FIG. 3).

B-1-3. Rolling Step

The drying step is followed by rolling of the positive electrode 10Y.

The rolling step rolls the positive electrode 10Y having the positive electrode mixture slurry layer 12Y formed by drying the positive electrode slurry coated on a surface of the positive electrode collector 11. This increases the density of the positive electrode active material in the positive electrode mixture slurry layer 12Y, and forms the positive electrode mixture layer 12.

In the rolling step, the method used to roll the positive electrode 10Y is not particularly limited, and may be appropriately selected from methods known to a skilled person. For example, the positive electrode 10Y may be rolled using a roll press machine.

(c) of FIG. 3 shows a cross sectional shape of the positive electrode 10 after the rolling step. The region coated with a larger amount of positive electrode slurry (the high-density portion designated region 50) becomes the high-density portion 13 upon being rolled, and the region coated with a smaller amount of positive electrode slurry (the low-density portion designated region 51) becomes the low-density portion 14 upon being rolled. The region where the positive electrode slurry flows into from the region coated with a larger amount of positive electrode slurry (the high-density portion designated region 50) to the region coated with a smaller amount of positive electrode slurry (the low-density portion designated region 51) becomes a region where the density is different from place to place (the density gradient region 15).

B-2. Second Step

In the second step of the present embodiment, the negative electrode 20 is disposed that has the negative electrode collector 21 and the negative electrode mixture layer 22 formed on a surface of the negative electrode collector 21. Specifically, the second step includes a coating step, a drying step, and a rolling step.

The following describes each step.

B-2-1. Coating Step

In the coating step, a negative electrode slurry containing a negative electrode mixture is coated on a surface of the negative electrode collector 21 to form a negative electrode mixture slurry layer on the surface of the negative electrode collector 21.

The negative electrode slurry contains a solvent, and a negative electrode active material and a binder dissolved or dispersed in the solvent. The negative electrode active material and the binder are not particularly limited, and may be appropriately selected from, for example, the examples above. The solvent is not particularly limited, as long as it can dissolve or disperse the binder, and the same binder used for the positive electrode slurry may be used. As with the case of the positive electrode slurry, the negative electrode slurry may further contain various additives such as a conductive auxiliary agent, a dispersant, a surfactant, and a rheology adjuster, as required.

The coating step of the second step is the same as the coating step of the first step. For details, refer to the coating step in section B-1-1 above by replacing "positive electrode" with "negative electrode".

B-2-2. Drying Step

The coating step is followed by drying of the negative electrode 20.

In the drying step, the negative electrode mixture slurry layer formed on a surface of the negative electrode collector 21 is dried to bond the negative electrode collector 21 and the negative electrode mixture slurry layer to each other.

The drying step of the second step is the same as the drying step of the first step. For details, refer to the drying step in section B-1-2 above by replacing "positive electrode" with "negative electrode".

B-2-3. Rolling Step

The drying step is followed by rolling of the negative electrode 20.

The rolling step rolls the negative electrode having the negative electrode mixture slurry layer formed by drying the negative electrode slurry coated on a surface of the negative electrode collector 21. This increases the density of the negative electrode active material in the negative electrode mixture slurry layer, and forms the negative electrode mixture layer 22.

The rolling step of the second step is the same as the rolling step of the first step. For details, refer to the rolling step in section B-1-3 above by replacing "positive electrode" with "negative electrode".

B-3. Third Step

The third step is performed after the positive electrode 10 and the negative electrode 20 are produced in the first step and the second step.

In the third step (lamination step), the positive electrode 10, the separator 30, and the negative electrode 20 are laminated to produce the electricity-generating unit 40 for lithium-ion secondary battery 1.

The separator 30 disposed between the positive electrode 10 and the negative electrode 20 is not particularly limited, as long as it can isolate the positive electrode 10 and the negative electrode 20 from each other, and allows for movement of lithium ions inside the separator 30 (inside the material of the separator 30, or inside the space created in the separator 30), as described above. The material of the separator 30 is not particularly limited, and, for example, may be appropriately selected from the examples above.

As described above, the positive electrode 10, the negative electrode 20, and the separator 30 are disposed preferably in the electrolytic solution. For example, the electricity-generating unit 40 including the separator 30 disposed between the positive electrode 10 and the negative electrode 20 may be inserted in the battery casing 60, and the electrolytic solution may be injected into the battery casing 60 to dispose the positive electrode 10, the negative electrode 20, and the separator 30 in the electrolytic solution. The electricity-generating unit 40 for lithium-ion secondary battery 1 formed in this manner may be of a laminated type or a wound type.

EXAMPLES

The present disclosure is described below with reference to Examples. It is to be noted that the present disclosure is not limited by the following Examples.

Examples 1 to 3

A positive electrode coating material was prepared by mixing 1 weight part of carbon black (conductive auxiliary agent), 1 weight part of polyvinylidene fluoride (binder), and 25 weight parts of N-methyl-2-pyrrolidone (solvent) with respect to 100 weight parts of lithium cobalt oxide (positive electrode active material). The positive electrode coating material was applied to one surface of a 15 μm-thick aluminum foil using a doctor blade or the like, and dried. The high-density portion had a thickness of 100 μm, and the low-density portion had a thickness of 70 μm after drying. After drying, the sheet was rolled to make the thickness of the positive electrode mixture layer 70 μm using a rolling machine, and a positive electrode plate was obtained. The high-density portion and the low-density portion were formed in the pattern shown in FIG. 2A. The area ratio of the low-density portion and the high-density portion (the area of the low-density portion/the area of the high-density portion) in planar view was 1/5 (Example 1), 1/10 (Example 2), and 1/20 (Example 3). The high-density portion had a density of 3.66 g/cm$^3$, and the low-density portion had a density of 2.50 g/cm$^3$ after rolling. The density gradient region was formed along the boundary between the high-density portion and the low-density portion. The density gradient region had a density of 2.50 g/cm$^3$ to 3.66 g/cm$^3$, and had a width that was about 1/5 of the width of the low-density portion in plane direction. The density was calculated from the measured thickness and weight of the electrode plate that had been cut to a certain size.

Comparative Example 1

In Comparative Example 1, a positive electrode plate was produced in the same manner as in Examples 1 to 3, except that the positive electrode coating material used in Examples 1 to 3 was applied with a doctor blade to one surface of a 15 μm-thick aluminum foil so as to obtain a uniform thickness of 100 μm after drying.

Evaluation was made in the same manner as in Example 1.

EVALUATION

Evaluation of Impregnation of Electrolytic Solution

The positive electrode plates of Examples 1 to 3 and Comparative Example 1 were evaluated for impregnation of the electrolytic solution. For evaluation, a 1-cm$^2$ sample was cut from the rolled positive electrode plate. A certain quantity of electrolytic solution was then dropped onto the sample, and the time it took for the sample to be completely impregnated with the electrolytic solution was measured with a stopwatch.

The results of measurement are presented in Table 1.

TABLE 1

| | Area of low-density portion/area of high-density portion | Mixture capacity (%) | Impregnation time of electrolytic solution (s) |
|---|---|---|---|
| Example 1 | 1/5 | 93.7 | 10 |
| Example 2 | 1/10 | 96.8 | 12 |
| Example 3 | 1/20 | 98.4 | 76 |
| Comparative Example 1 | 0/100 | 100.0 | 763 |

As can be seen from the results for Examples 1 to 3 and Comparative Example 1, the impregnation time of the electrolytic solution shows a large decrease for area proportions of the low-density portion (the area of low-density portion/area of high-density portion) between 0/100 to 1/10. However, the impregnation time of the electrolytic solution hardly changes for area proportions of the low-density portion larger than 1/10 (1/10 to 1/5). This is because impregnation of the electrolytic solution into the electricity-generating unit improves when the high-density portion formed in the positive electrode mixture layer has a larger area than the low-density portion in planar view.

On the other hand, the rate of mixture capacity decrease is higher when the proportion of the low-density portion (the area of low-density portion/the area of high-density portion) is larger than 1/10 (1/10 to 1/5) than when it is between 0/100 to 1/10.

Considering the balance between impregnation of the electrolytic solution and the rate of mixture capacity decrease, it is considered desirable that the proportion of the low-density portion in the positive electrode mixture layer is 1/10 or smaller.

DESCRIPTION SUMMARY

As described above, the lithium-ion secondary battery 1 according to the present embodiment includes: a positive electrode 10 having a positive electrode collector 11 and a positive electrode mixture layer 12 formed on a surface of the positive electrode collector 11; a negative electrode 20 having a negative electrode collector 21 and a negative electrode mixture layer 22 formed on a surface of the negative electrode collector 21; and a separator 30 disposed between the positive electrode 10 and the negative electrode 20. At least one of the positive electrode mixture layer 12 and the negative electrode mixture layer 22 has a high-density portion 13 of high mixture density, and a low-density portion 14 having a lower mixture density than the high-density portion 13 and being in contact with the high-density portion 13. The low-density portion 14 has a smaller area than the high-density portion 13 when viewed in plan. In this way, the impregnation time of the electrolytic solution into the electrode can be reduced without greatly lowering the battery capacity.

In the lithium-ion secondary battery 1 according to the present embodiment, a density gradient region 15, which is a region where the density shows gradual changes from place to place, may be provided at the boundary between the high-density portion 13 and the low-density portion 14, and in at least a part of regions in the vicinity of the boundary. In this way, a capacity drop of the mixture layer can be reduced while reducing the impregnation time of the electrolytic solution into the electrode.

In the lithium-ion secondary battery 1 according to the present embodiment, the low-density portion 14 may have an area that is 1/10 of the area of the high-density portion 13, or smaller. In this way, the impregnation time of the electrolytic solution into the electrode plate (e.g., positive electrode 10) can be further reduced while reducing a capacity drop of the mixture layer (e.g., positive electrode mixture layer 12).

The lithium-ion secondary battery 1 according to the present embodiment may include a wound electricity-generating unit 40 that includes the positive electrode 10, the negative electrode 20, and the separator 30, and the low-density portion 14 may be at least partly exposed at the end portion 41 and/or the end portion 42 in the lengthwise direction of the electricity-generating unit 40. During the expansion of the electrode (e.g., positive electrode 10), the electrolytic solution moves to the upper portion 71 and the lower portion 72 of the lithium-ion secondary battery 1 in lengthwise direction, and to regions in the vicinity of the upper portion 71 and the lower portion 72. The electrolytic solution that has moved to the upper portion 71 and the lower portion 72, and to regions in the vicinity of these portions joins the low-density portion 14, and the electrode plate (e.g., positive electrode 10) can be more quickly impregnated with the electrolytic solution.

In the lithium-ion secondary battery 1 according to the present embodiment, the low-density portion 14 may be at least partly exposed at the both end portions 41 and 42 of the electricity-generating unit 40, and disposed in different directions as viewed from the center of the electricity-generating unit 40. During the expansion of the electrode (e.g., positive electrode 10), the electrolytic solution moves to the upper portion 71 and the lower portion 72 of the lithium-ion secondary battery 1 in the lengthwise direction, and to regions in the vicinity of the upper portion 71 and the lower portion 72. The electrolytic solution that has moved to the upper portion 71 and the lower portion 72, and to regions in the vicinity of these portions joins the low-density portion 14, and the electrode plate (e.g., positive electrode 10) can be more quickly impregnated with the electrolytic solution.

A method for manufacturing a lithium-ion secondary battery 1 according to the present embodiment includes:

a first step of producing a positive electrode 10 that includes a positive electrode collector 11, and a positive electrode mixture layer 12 formed on a surface of the positive electrode collector 11;

a second step of producing a negative electrode 20 that includes a negative electrode collector 21, and a negative electrode mixture layer 22 formed on a surface of the negative electrode collector 21; and a third step of disposing the positive electrode 10, a separator 30, and the negative electrode 20 so as to interpose the separator 30 between the positive electrode 10 and the negative electrode 20, at least one of the positive electrode mixture layer 12 and the negative electrode mixture layer 22 having a high-density portion 13 of high mixture density, and a low-density portion 14 having a lower mixture density than the high-density portion 13 and being in contact with the high-density portion 13, the low-density portion 14 having a smaller area than the high-density portion 13 when viewed in plan.

The number of manufacturing steps can be reduced by applying the mixture to the electrode plate in such a manner that the coating layer forms in different thicknesses in the regions where the high-density portion 13 and the low-density portion 14 are formed. With the balanced area proportions of the high-density portion 13 and the low-density portion 14, the lithium-ion secondary battery requires a shorter time for the impregnation of the electrolytic solution in the electrode, and this can be achieved without greatly lowering the battery capacity.

The described embodiments and examples of a lithium-ion secondary battery are not intended to limit the present disclosure. Various changes may be made to the embodiments and examples above as may be conceived by a skilled person, and the disclosure may be implemented by combining some of the constituting elements of the embodiments and examples, provided that such changes and modifications do not depart from the gist of the present disclosure. Such changes and implementations are also intended to fall within the scope of the present disclosure.

INDUSTRIAL APPLICABILITY

A lithium-ion secondary battery of the present disclosure is useful as a battery for a wide range of applications, including, for example, handheld information devices, portable electronic devices, home power-storage devices, motor-driven two-wheel vehicles, electric vehicles, and hybrid electric vehicles.

What is claimed is:

1. A lithium-ion secondary battery comprising:
   a positive electrode having a positive electrode collector, and a positive electrode mixture layer formed on a surface of the positive electrode collector;
   a negative electrode having a negative electrode collector, and a negative electrode mixture layer formed on a surface of the negative electrode collector;

a separator disposed between the positive electrode and the negative electrode;

at least the positive electrode mixture layer includes a pattern of a high-density portion of high mixture density and a low-density portion having a lower mixture density than the high-density portion and being in contact with the high-density portion, the low-density portion having a smaller area than an area of the high-density portion when viewed in plan and the pattern of the low-density portion and the high-density portion being repeated in an alternating manner along a lengthwise or a widthwise direction in the positive electrode mixture layer; and a density gradient region at a boundary between the high-density portion and the low-density portion, and in at least a part of regions in a vicinity of the boundary, the density gradient region being a region where a density shows gradual changes from place to place.

2. The lithium-ion secondary battery according to claim 1, wherein the low-density portion has an area that is 1/10 of the area of the high-density portion, or smaller.

3. The lithium-ion secondary battery according to claim 2, wherein the low-density portion has an area that is between 1/20 to 1/10 of the area of the high-density portion.

4. The lithium-ion secondary battery according to claim 1, further comprising an electricity-generating unit that includes the positive electrode, the negative electrode, and the separator in a wound type configuration.

5. The lithium-ion secondary battery according to claim 1, wherein a planar width of the density gradient region is at least 1/5 of a planar width of the low-density portion.

6. The lithium-ion secondary battery according to claim 1, wherein the positive electrode collector is an aluminum foil.

7. The lithium-ion secondary battery according to claim 1, wherein the negative electrode collector is a copper foil.

8. The lithium-ion secondary battery according to claim 1, wherein the high-density portion and the low-density portion have substantially a same thickness.

9. A method for manufacturing a lithium-ion secondary battery, the method comprising:

producing a positive electrode that includes a positive electrode collector, and a positive electrode mixture layer formed on a surface of the positive electrode collector;

producing a negative electrode that includes a negative electrode collector, and a negative electrode mixture layer formed on a surface of the negative electrode collector;

disposing the positive electrode, a separator, and the negative electrode so as to interpose the separator between the positive electrode and the negative electrode;

at least the positive electrode mixture layer includes a pattern of a high-density portion of high mixture density and a low-density portion having a lower mixture density than the high-density portion and being in contact with the high-density portion, the low-density portion having a smaller area than an area of the high-density portion when viewed in plan and the pattern of the low-density portion and the high-density portion being repeated in an alternating manner along a lengthwise or a widthwise direction in the positive electrode mixture layer; and producing a density gradient region at a boundary between the high-density portion and the low-density portion, and in at least a part of regions in a vicinity of the boundary, the density gradient region being a region where a density shows gradual changes from place to place.

* * * * *